ically deformable member is arranged about the steering spindle which is disposed with its one end face adjacent to the impact pot.

United States Patent
Barényi

[15] 3,641,834
[45] Feb. 15, 1972

[54] SAFETY STEERING ARRANGEMENT
[72] Inventor: Béla Barényi, Maichingen, Germany
[73] Assignee: Daimler-Benz Aktiengesellschaft, Stuttgart-Unterturkheim, Germany
[22] Filed: Oct. 17, 1969
[21] Appl. No.: 867,275

[30] Foreign Application Priority Data
Oct. 19, 1969 Germany.....................P 18 04 034.1

[52] U.S. Cl...............................................74/492, 74/552
[51] Int. Cl............................................................B62d 1/18
[58] Field of Search....................................74/492, 493, 552

[56] References Cited
UNITED STATES PATENTS
3,167,974  2/1965  Wilfert.............................74/492 X
3,434,367  3/1969  Renneker et al.........................74/492
3,483,770  12/1969  Eibl et al..................................74/552

*Primary Examiner*—Milton Kaufman
*Attorney*—Craig, Antonelli and Hill

[57] ABSTRACT

A safety steering arrangement for motor vehicles, especially for passenger motor vehicles in which the steering wheel is connected with the axially displaceably supported steering spindle by way of an unguided impact pot, and in which an axially deformable member is arranged about the steering spindle which is disposed with its one end face adjacent to the impact pot.

28 Claims, 6 Drawing Figures

INVENTOR
BELA BARENYI

BY
Craig, Antonelli, Stewart & Hill

ATTORNEYS

INVENTOR
BÉLA BARÉNYI

BY Craig, Antonelli & Hill
ATTORNEYS

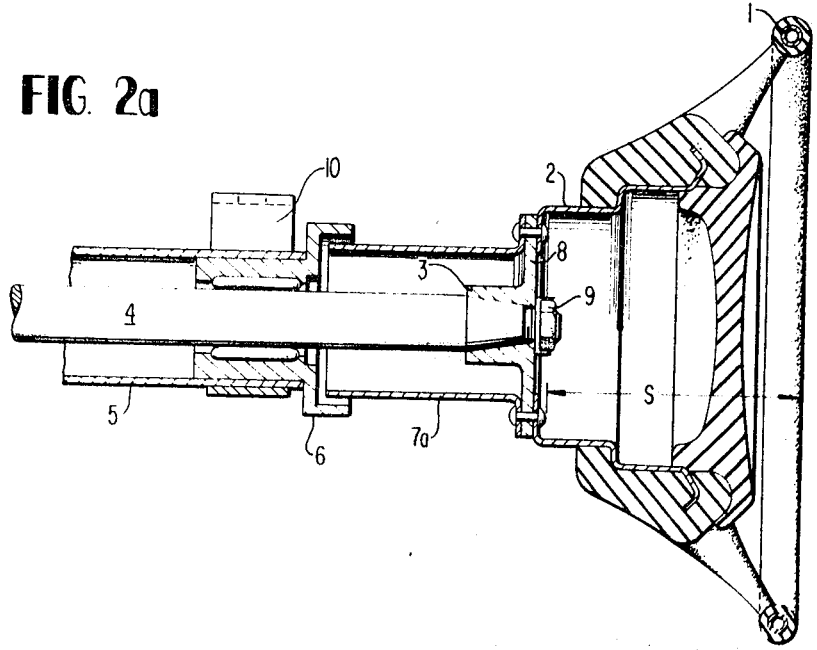
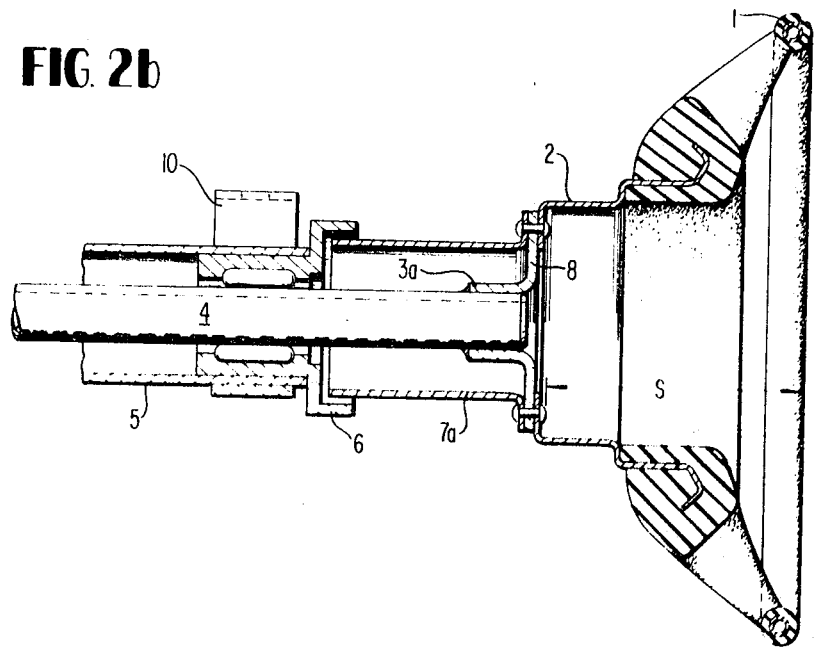

SAFETY STEERING ARRANGEMENT

The present invention relates to a safety steering arrangement for motor vehicles, especially passenger motor vehicles, consisting of an axially displaceably supported steering spindle provided with an axially deformable structural element, on which is secured the steering wheel by way of an unguided impact pot.

Steering arrangements in which the steering wheel is secured at the steering spindle by way of an impact pot, i.e., by way of a potlike deformation member are known as such in the prior art (German Pat. No. 947,048). These arrangements offer already a far-reaching protection against injuries of the driver in case of an impact against the steering column. Safety steering arrangements of the aforementioned type, as have become known, for example, by the German Pat. No. 1,126,749, take into further consideration the requirements for internal safety and offer to the driver of the motor vehicle a still more complete protection because the available deformation path, along which the impact energy can be reduced, is still greater. Compared to all other safety steering arrangements in which, for example, telescopically nested steering columns are provided, safety steering arrangements of the aforementioned type entail in particular the advantage that in case of a vehicle collision and of an impact of the driver against the steering wheel, they become effective reliably and offer the sought-after protection.

The present invention is concerned with the task to still further improve safety steering systems of this type and to create in particular an arrangement which offers the most far-reaching safety in case of accidents, yet can be manufactured in a simple manner, does not require any additional space and can also be readily assembled and installed.

The present invention essentially consists in that the axially deformable structural element consists of one or several permanently deformable parts arranged about the steering spindle and is arranged on the side of the steering wheel opposite the driver directly adjoining the impact pot. By this construction a safety steering arrangement is achieved in which the impact pot as unguided deformation member makes possible both an angular positioning of the steering wheel in case of an oblique impact of the driver as also is able to absorb forces in the axial direction. The axially guided deformation part adjoining the same may absorb the excess axially effective impact energy. Notwithstanding this double effectiveness, the new safety steering arrangement according to the present invention is compact and utilizes essentially only the free space, available any how, between the steering wheel and the instrument panel for the arrangement and accommodation of the deformation part or of the deformation parts so that no additional space requirement exists.

A simple type of construction results if the axially deformable part is constructed as a stepped deformation cylinder, possibly also as corrugated or undulated tubing. As a result of the subdivision according to the present invention into an unguided deformation member and into a guided deformation member, the pivoting freedom of the steering wheel and the absolutely precise transmission of the forces necessary for the steering is assured, notwithstanding a maximum deformation path. Also, in case of unintentional eccentric overloads, the plane of rotation of the steering wheel remains accurately preserved even though the minimum distance for the deformation path of 25 cm., necessary according to the most recent findings in the accident research, can be readily realized and even exceeded.

A particularly advantageous type of construction of the safety steering arrangement according to the present invention results if the deformation cylinder is secured on one side at the steering housing and is disposed with a free end face directly opposite a flange arranged at the impact pot. The flange may thereby serve as securing means for the impact pot, preferably padded within the area of the center of the steering wheel, and for the steering wheel so that a particularly simple type of construction is attained. Particularly simple, especially as regards the assembly and installation, is a type of construction in which the deformation cylinder is also secured at the flange and is disposed with its free end face directly opposite an abutment ring at the steering gear housing.

If, with this type of construction, the flange is provided with a collar, which is adapted to be slipped over the end of the steering spindle and is adapted to be secured thereat, then the significant advantage is realized that the entire steering wheel together with impact pot and deformation cylinder represents a preassembled structural unit that can be subsequently mounted and secured in a simple operation on the end of the steering spindle.

Accordingly, it is an object of the present invention to provide a safety steering arrangement of the aforementioned type which avoids by simple and operationally reliable means the aforementioned shortcomings and drawbacks encountered in the prior art.

Another object of the present invention resides in a safety steering arrangement for motor vehicles which not only further improves the safety factor thereof but offers the advantage of simple manufacture and ease of installation.

A further object of the present invention resides in a safety steering arrangement for motor vehicles which offers added protection yet substantially requires no additional space.

These and further objects, features and advantages of the present invention will become more obvious from the following description when taken in connection with the accompanying drawing which shows, for purposes of illustration only, several embodiments in accordance with the present invention, and wherein:

FIG. 2a is an axial cross-sectional view through a modified embodiment of a safety steering arrangement in accordance with the present invention in which the steering wheel inclusive impact pot and deformation member can be mounted as preassemblable structural unit on the end of the steering spindle;

FIG. 2b is an axial cross-sectional view, similar to FIG. 2a, through a slightly modified embodiment of a safety steering arrangement according to the present invention.

Figure 1A:
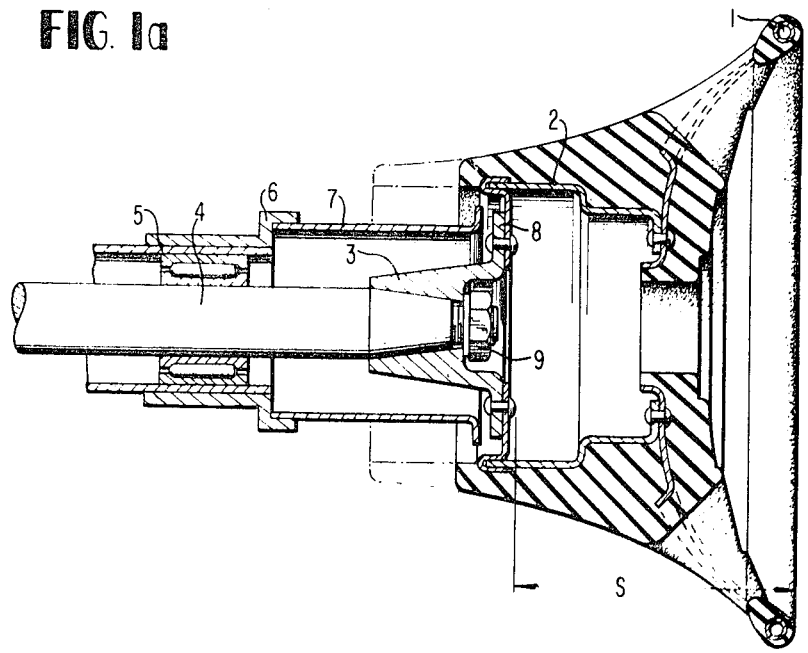
FIG. 1a is an axial cross-sectional view through a first embodiment of a safety steering arrangement in which the steering wheel is secured at the end of the steering spindle by way of an impact pot whereas an axially deformable cylinder is secured at the end of the steering gear housing.
Figure 1B:
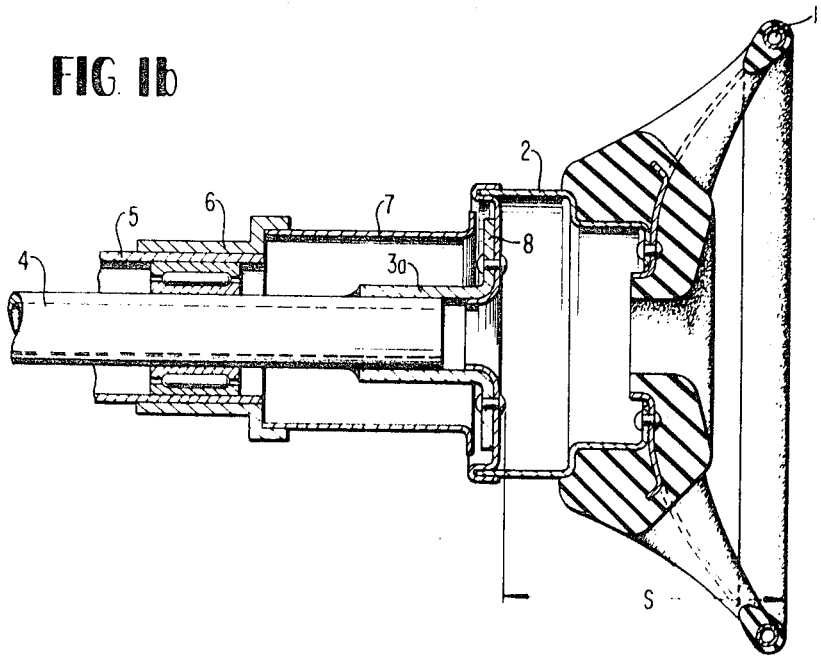
FIG. 1b is a axial cross-sectional view, similar to FIG. 1a, through a slightly modified embodiment of a safety steering arrangement according to the present invention.

Referring now to the drawing, wherein like reference numerals are used throughout the various views to designate like parts, and more particularly to FIGS. 1a and 1b, a steering wheel 1 is connected in these figures by way of an impact pot 2, offset in a steplike manner, with a collar 3 that is seated securely on the end of the steering spindle 4. The steering spindle 4 is axially displaceably supported in a conventional manner, not illustrated in detail herein. For example, the steering spindle 4 may be connected at its lower end (not shown) by way of a conventional joint with the steering gear so that impacts on the steering gear are not transmitted to the steering spindle 4. The steering spindle 4 is supported in an outer column 5 which is provided at its one end with a collar 6, in which is secured a deformation cylinder 7. The deformation cylinder 7 is, with its right end bent into an annular surface, disposed opposite a flange 8 that is securely connected with the collar 3. The impact pot 2 together with the possibly padded steering wheel 1 is secured at the flange 8.

The collar 3 is provided in FIG. 1a with a cone that is placed over the similarly conically constructed end of the steering spindle 4 and is secured with the aid of a nut 9. In FIG. 1b, the collar 3a is constructed as cylindrical part which is placed over the end of the steering spindle 4 and is, for example, welded thereto.

In case of an impact of the driver against the steering wheel 1, at first the impact pot 2 is able to deform whereby already part of the impact energy is absorbed. The deformation path adapted to be absorbed by the impact pot 2 corresponds maximum to the distance S, whereby the impact pot 2 in case of oblique impact against the steering wheel is also able to yield one sidedly because it includes no guide members of any kind. It thus enables the angular positioning of the steering wheel 1 necessary in case of an oblique impact without the occurrence of the danger that the axial displaceability of the steering spindle 4 is impaired by jamming or wedging. In case of larger impacts the deformation member 7 arranged adjoining the impact pot 2, which by reason of the axial guidance at the steering spindle 4 only has to absorb now longitudinal forces, can absorb the remaining impact energy. This arrangement no longer ties the designer both as to configuration as also especially in the diameter dimensions to the maintenance of other requirements such as, for example, to the consideration of the pivotability, knee freedom, drawing engineering, etc. In lieu of a deformation member, also a stepped cylinder or a corrugated tubing may be used. Also, several plastically deformable rods or tubular elements arranged concentrically about the steering spindle, which may be constituted deformable possibly with the aid of through bores, may be utilized. Of course, it is also possible to utilize the construction according to the present invention if no outer column but instead a steering housing is provided for the steering spindle.

In FIGS. 2a and 2b, the steering wheel 1 is also connected with an impact pot 2 which is mounted on the flange 8 that is seated by way of the collar 3 at the also axially displaceably supported steering spindle 4. The impact pot 2 is constructed in this embodiment as a stepped pot increasing in diametric dimensions toward the right. In this embodiment, however, a deformation cylinder 7a is also mounted at the flange 8, which in this case is disposed with its left end opposite the collar 6 of the outer column 5. In FIG. 2a, the collar 3 is provided with a cone, which similar to FIG. 1a is assembled from the right over the end of the steering spindle 4 and can be secured by means of a nut 9. FIG. 2b is similar to FIG. 2a and differs therefrom only by the cylindrical configuration of the collar 3a and its welded connection with the spindle 4. The embodiments illustrated in FIGS. 2a and 2b offer the significant advantage that the steering wheel 1 inclusive impact pot 2 and deformation cylinder 7a is constructed as preassemblable structural unit which is mounted, for example, only after the complete installation of the steering arrangement from the right over the end of the steering spindle 4 and is then completely secured by a single operation.

Figure 1C:
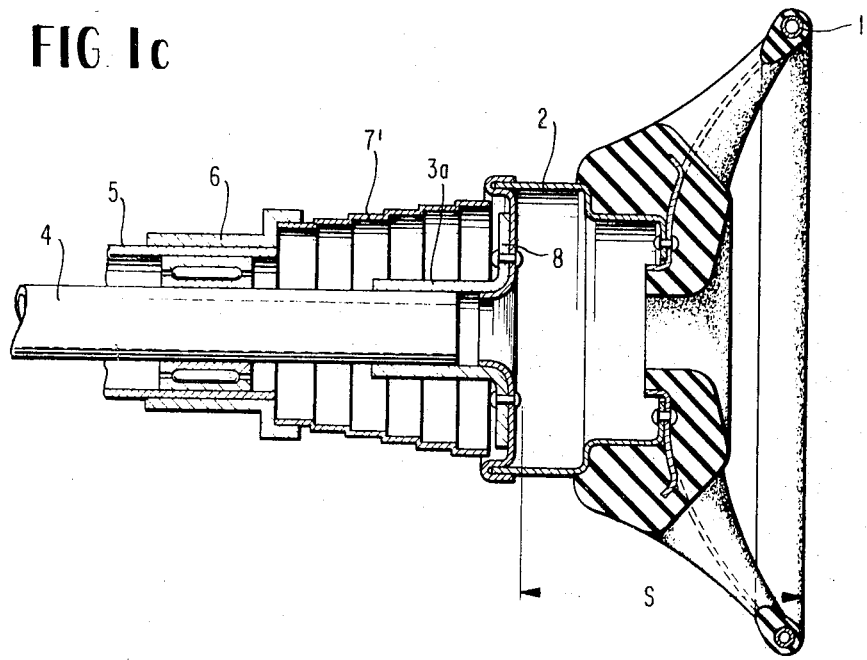
FIG. 1c is an axial cross-sectional view, similar to FIG. 1b, except for the modified stepped deformation member.
Figure 2C:
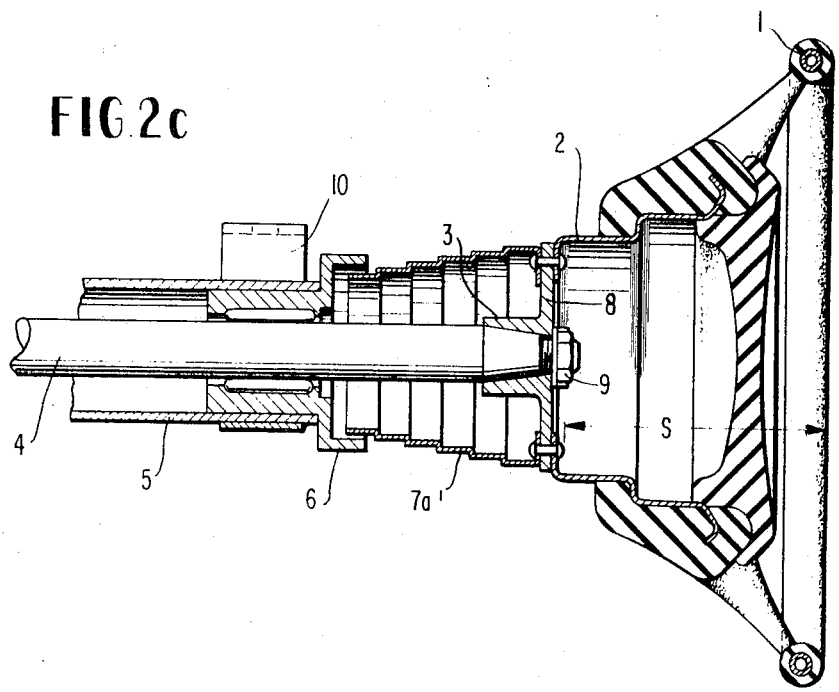
FIG. 2c is an axial cross-sectional view, similar to FIG. 2a, except for the modified stepped deformation member.

Modified deformation cylinders 7' and 7a' of stepped configuration are shown in FIGS. 1c and 2c by dashed lines. This stepped configuration is useful in that different collapse characteristics can be obtained thereby.

The outer column 5 is connected with the body by means of a clamping device 10 of any conventional construction which is not illustrated in detail herein. Obviously, such clamping device may also be used in connection with the embodiments of FIGS. 1a and 1b.

While I have shown and described only several embodiments in accordance with the present invention, it is understood that the same is not limited thereto but is susceptible of numerous changes and modifications as known to those skilled in the art, and I therefore do not wish to be limited to the details shown and described herein but intend to cover all those changes and modifications as are within the scope of those skilled in the art.

I claim:

1. A safety steering arrangement for motor vehicles, which includes a steering spindle axially displaceably supported and provided with an axially deformable structural element, and in which the steering wheel is secured on the steering spindle by way of an unguided impact pot means, characterized in that the axially deformable structural element is essentially formed of permanently deformable means arranged about the steering spindle, and in that said permanently deformable means is arranged on the side of the steering wheel opposite the driver adjacent to the impact pot means.

2. A safety steering arrangement according to claim 1, wherein said permanently deformable means consists of one single part arranged about the steering spindle.

3. A safety steering arrangement according to claim 1, wherein said permanently deformable means is arranged directly adjacent the impact pot means.

4. A safety steering arrangement according to claim 1, characterized in that said deformable means is constructed as a deformation cylinder.

5. A safety steering arrangement according to claim 4, characterized in that said deformation cylinder has a constant diameter along its axial length.

6. A safety steering arrangement according to claim 4, characterized in that the deformation cylinder is a stepped cylinder.

7. A safety steering arrangement according to claim 4, characterized in that the deformation cylinder is secured at a flange arranged at the impact pot means and is disposed with it free end face directly opposite a collar at an outer column.

8. A safety steering arrangement according to claim 7, characterized in that the flange is provided with a collar which is placed over the end of the steering spindle and is secured thereat.

9. A safety steering arrangement according to claim 1, characterized in that the deformation means is secured on one side at an outer column and is disposed with a free end face thereof directly opposite a flange arranged at the impact pot means.

10. A safety steering arrangement according to claim 9, characterized in that the flange is provided with a collar which is placed over the end of the steering spindle and is secured thereat.

11. A safety steering arrangement according to claim 9, characterized in that the flange serves as securing means for the impact pot means and the steering wheel.

12. A safety steering arrangement according to claim 1, characterized in that the deformation means is secured at a flange arranged at the impact pot means and is disposed with it free end face directly opposite a collar at an outer column.

13. A safety steering arrangement according to claim 12, characterized in that the flange is provided with a collar which is placed over the end of the steering spindle and is secured thereat.

14. A safety steering arrangement for motor vehicles, which includes a steering spindle axially displaceably supported on a spindle support means, a steering wheel secured on the steering spindle by way of an unguided impact pot means, and an axially deformable structural element essentially formed of permanently deformable means arranged about the steering spindle on the side of the steering wheel opposite the driver adjacent the impact pot means and attached to one of said spindle support means and impact pot means, said structural element being positioned so as to contact the other of said spindle support means and impact pot means upon axial displacement of the spindle.

15. A safety steering arrangement according to claim 14, characterized in that said deformable means is constructed as a deformation cylinder.

16. A safety steering arrangement according to claim 15, characterized in that the deformation cylinder is secured at one end thereof at an outer column of the spindle means and is disposed with a free end face thereof directly opposite a flange arranged at the impact pot means.

17. A safety steering arrangement according to claim 16, characterized in that the flange serves as securing means for the impact pot means and the steering wheel.

18. A safety steering arrangement according to claim 17, characterized in that the impact pot means is padded within the area of the center of the steering wheel.

19. A safety steering arrangement according to claim 16, characterized in that the flange is provided with a collar which is placed over the end of the steering spindle and is secured thereat.

20. A safety steering arrangement according to claim 15, characterized in that said deformation cylinder has a constant diameter along is axial length.

21. A safety steering arrangement according to claim 15, characterized in that the deformation cylinder is a stepped cylinder.

22. A safety steering arrangement according to claim 15, characterized in that the deformation cylinder is secured at a flange arranged at the impact pot means and is disposed with the free end face directly opposite a collar at an outer column.

23. A safety steering arrangement according to claim 22, characterized in that the flange is provided with a collar which is placed over the end of the steering spindle and is secured thereat.

24. A safety steering arrangement according to claim 14, characterized in that the deformation means is secured at one end thereof in an outer column of the spindle support means and is disposed at the free end face thereof directly opposite a flange arranged at the impact pot means.

25. A safety steering arrangement according to claim 24 characterized in that the flange is provided with a collar which is placed over the end of the steering spindle and is secured thereat.

26. A safety steering arrangement according to claim 24, characterized in that the flange serves as securing means for the impact pot means and the steering wheel.

27. A safety steering arrangement according to claim 14, characterized in that the deformation means is secured at a flange arranged at the impact pot means and is disposed with its free end face directly opposite a collar at an outer column.

28. A safety steering arrangement according to claim 27, characterized in that the flange is provided with a collar which is placed over the end of the steering spindle and is secured thereat.

* * * * *

UNITED STATES PATENT OFFICE
CERTIFICATE OF CORRECTION

Patent No. 3,641,834        Dated February 15, 1972

Inventor(s) Bela Barenyi

It is certified that error appears in the above-identified patent and that said Letters Patent are hereby corrected as shown below:

Column 1, line 8, which now reads:

"Oct. 19, 1969     Germany     P 18 04 034.1 should read as follows:

-- Oct. 19, 1968     Germany     P 18 04 034.1 --

Signed and sealed this 27th day of June 1972.

(SEAL)
Attest:

EDWARD M. FLETCHER, JR.        ROBERT GOTTSCHALK
Attesting Officer               Commissioner of Patents